United States Patent
Prathipati (10) Patent No.: US 10,785,437 B2
(45) Date of Patent: Sep. 22, 2020

(54) AREA AND POWER EFFICIENT MULTI-VOLTAGE ROW DRIVER CIRCUITRY FOR IMAGE SENSORS

(71) Applicant: SEMICONDUCTOR COMPONENTS INDUSTRIES, LLC, Phoenix, AZ (US)

(72) Inventor: Anilkumar Prathipati, Evere (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/182,992

(22) Filed: Nov. 7, 2018

(65) Prior Publication Data
US 2020/0145597 A1    May 7, 2020

(51) Int. Cl.
| | |
|---|---|
| *H04N 5/376* | (2011.01) |
| *H04N 5/361* | (2011.01) |
| *H04N 5/3745* | (2011.01) |

(52) U.S. Cl.
CPC ............ *H04N 5/376* (2013.01); *H04N 5/361* (2013.01); *H04N 5/37452* (2013.01)

(58) Field of Classification Search
CPC ... G11C 11/4082; G11C 11/4085; G11C 8/06; G11C 8/08; H04N 5/3577–3658; H04N 5/376; H04N 5/378; H04N 5/335; H01L 27/146
See application file for complete search history.

(56) References Cited

U.S. PATENT DOCUMENTS

| | | | |
|---|---|---|---|
| 8,885,085 B2 | 11/2014 | Xu | |
| 2002/0140689 A1 | 10/2002 | Huang | |
| 2006/0097296 A1 | 5/2006 | Nam | |
| 2008/0043540 A1* | 2/2008 | Boemler | G11C 8/08 365/189.11 |
| 2013/0048831 A1 | 2/2013 | Bikumandla | |
| 2015/0189197 A1 | 7/2015 | Guo | |
| 2015/0244954 A1* | 8/2015 | Shin | H04N 5/376 250/208.1 |

* cited by examiner

*Primary Examiner* — Paul M Berardesca
(74) *Attorney, Agent, or Firm* — Treyz Law Group, P.C.; Jason Tsai (57) ABSTRACT

Image sensor pixels may receive row control signals for row driver circuitry. The row driver circuitry may include a plurality of row driver circuits each of which is capable of outputting row control signals at more than two power supply voltage levels. A row driver circuit may include only two level shifting circuits. A first level shifting circuit may control a first pull-up path operable to drive the row driver output to a first power supply voltage level and may also control a second pull-up path operable to drive the row driver output to a second power supply voltage level. A second level shifting circuit may control a first pull-down path operable to drive the row driver output to a third power supply voltage level and may also control a second pull-down path operable to drive the row driver output to a fourth power supply voltage level.

19 Claims, 8 Drawing Sheets

AREA AND POWER EFFICIENT MULTI-VOLTAGE ROW DRIVER CIRCUITRY FOR IMAGE SENSORS

BACKGROUND

This relates generally to imaging devices, and more particularly, to image sensors that include multi-voltage row drivers.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Column circuitry is coupled to each pixel column for reading out pixel signals from the image pixels. Row control circuitry is coupled to each pixel row for resetting, initiating charge transfer, or selectively activating a particular row of pixels for readout.

An image sensor pixel is typically powered using a positive power supply voltage and a ground power supply voltage. When performing charge transfer operations, for instance, the transfer gate can be turned on by using the row circuitry to supply the positive power supply voltage to a gate terminal of the transfer gate. When charge transfer operations are complete, the transfer gate can then be turned off by using the row circuitry to supply the ground power supply voltage to the gate terminal of the transfer gate. Controlling an image pixel using only two power supply voltage levels, however, may not provide optimal performance.

Techniques to improve imaging performance include temporarily overdriving the transfer gate using an elevated voltage that is greater than the positive power supply voltage to ensure that all the accumulated charge is sufficiently transferred from the photodiode to the floating diffusion region. Moreover, a negative voltage that is less than the ground power supply voltage can be temporarily supplied to the gate terminal of the transfer gate to reduce the risk of dark current, which can help minimize charge leakage. To generate the elevated voltage and the negative voltage in addition to the positive power supply voltage and the ground power supply voltage, conventional row drivers utilize large level shifters that occupy a significant amount of circuit area while consuming a large amount of power. This problem is especially exacerbated in global shutter pixels where all row drivers are simultaneously activated to reset an entire pixel array.

It is within this context that the embodiments herein arise.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
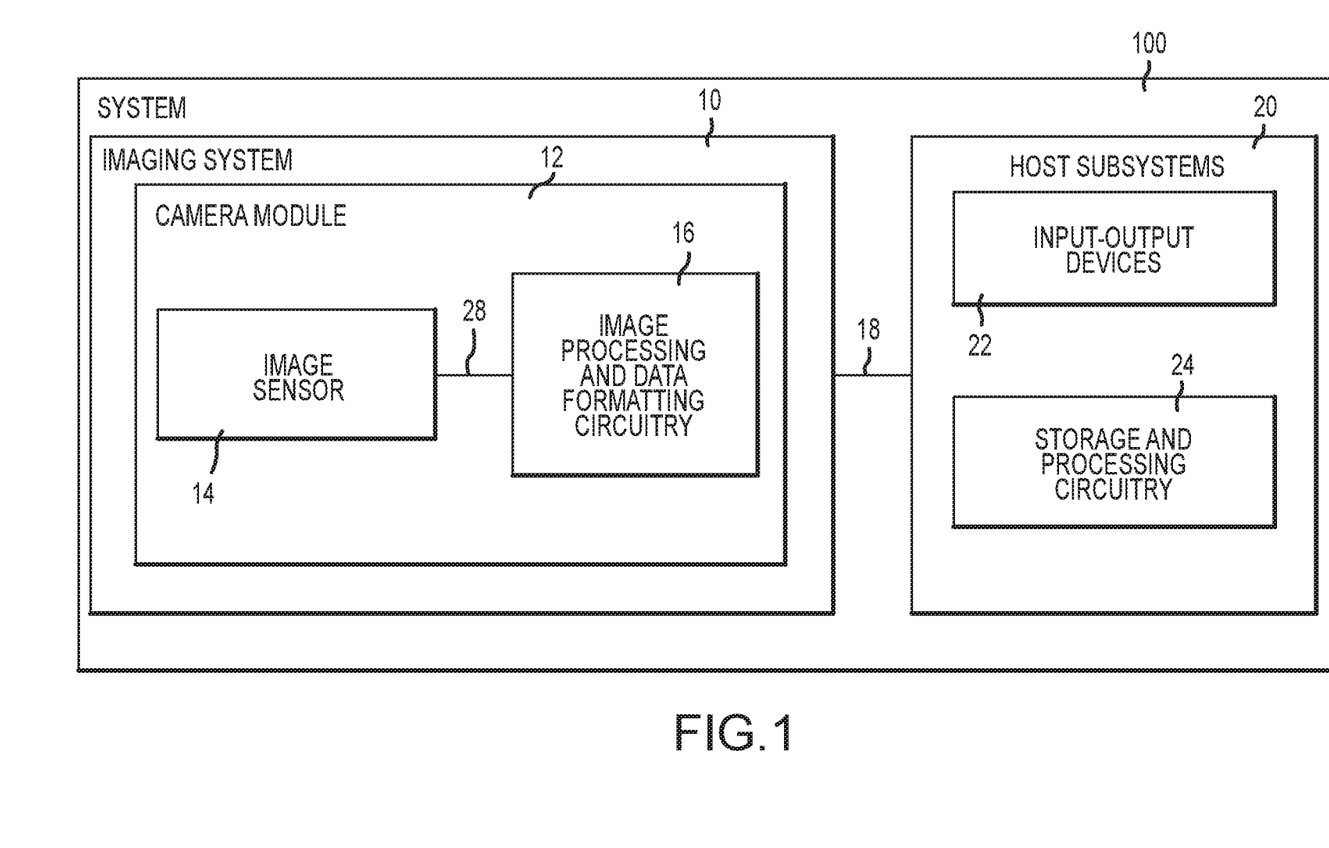
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SoC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
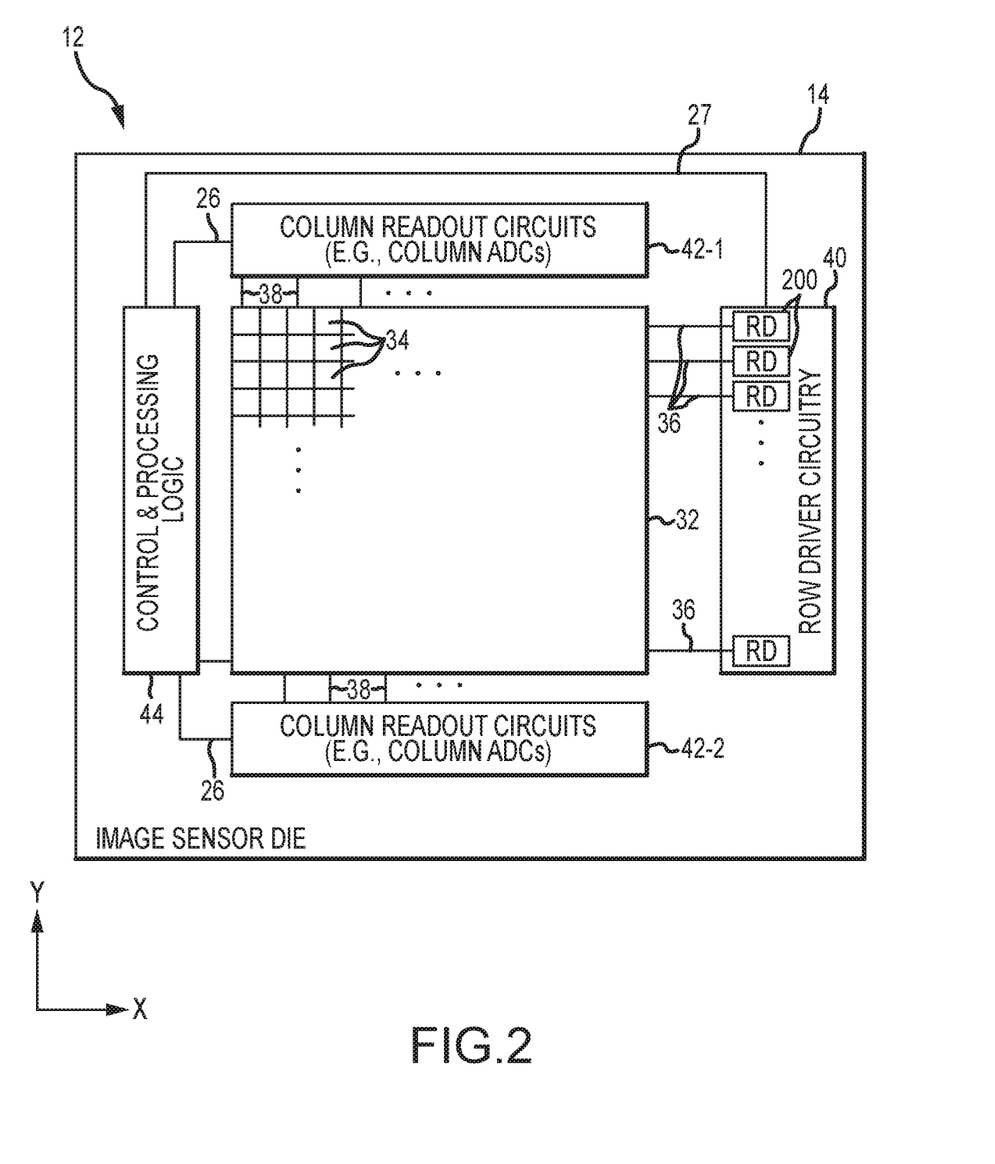
FIG. 2 is a diagram of an illustrative pixel array and associated row and column control circuitry for reading out image signals from an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 (sometimes referred to as control and processing logic) may correspond to image processing and data formatting circuitry 16 in FIG. 1. Image sensor 14 may include a pixel array such as array 32 of pixels 34 (sometimes referred to herein as image sensor pixels, imaging pixels, or image pixels 34). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to image pixels 34 over control paths 36 (e.g., pixel reset control signals, charge transfer control signals, blooming control signals, row select control signals, dual conversion gain control signals, or any other desired pixel control signals). Row control circuitry 40 includes individual row driver circuits 200 configured to generate these row control signals for each row of pixels and is therefore sometimes referred to as row driver circuitry. Although FIG. 2 shows only one row driver circuit 200 in a given row, each pixel row may actually include multiple row driver circuits each of which is responsible for generating a different row control signal (e.g., a reset control signal, a transfer control signal, a blooming control signal, a row select signal, etc.).

Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Figure 3:
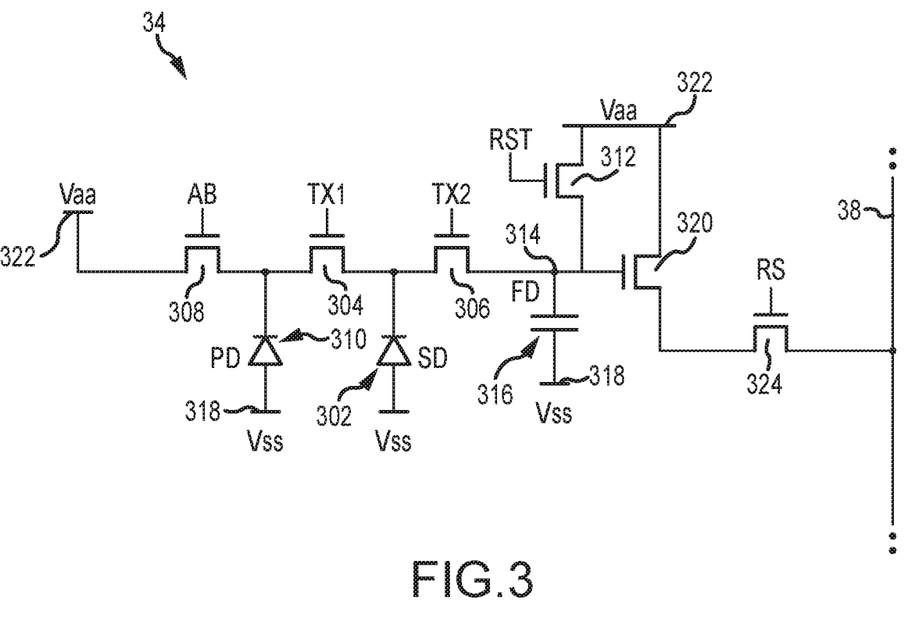
FIG. 3 is a circuit diagram of an image sensor pixel that uses a global shutter method of readout in accordance with an embodiment.

FIG. 3 is a circuit diagram of an image sensor pixel 34 that uses a global shutter method of readout. Image sensor pixel 34 represents a global shutter pixel with a pinned photodiode 310 (PD) coupled to a charge storage region 302 (sometimes referred herein to as a storage node). In some embodiments (as in FIG. 3), charge storage region 302 may be a storage diode (SD). Charge storage region 302 may alternatively be a storage gate or other desired type of charge storage region. Anti-blooming transistor 308 may be partially activated using control signal AB in order to draw away dark current that accumulates on photodiode 310. If desired, anti-blooming transistor 308 may be fully activated using control signal AB in order to reset the photodiode.

Impinging light (i.e., incident light) may generate charge in photodiode 310 in a sensor array (e.g., array 32 in FIG. 2). This charge may accumulate at photodiode 310 and may then be transferred to charge storage region 302 globally for all of the pixels at the same time by asserting control signal TX1 to activate transfer transistor 304. The readout of charge from the charge storage region 302 then proceeds in a sequential manner, row by row, by transferring charge via charge transferring transistor 306 to floating diffusion (FD) node 314 by asserting control signal TX2. Floating diffusion node 314 may have a floating diffusion capacitance 316 for storing charge. Photodiode 310, storage diode 302, and floating diffusion capacitance 316 may be coupled to ground 318. Charge transferred to floating diffusion node 314 causes the potential on this node to change and this change is sensed by the source follower transistor 320. The source terminal of the source follower transistor 320 is connected via row select transistor 324 to the sensor array column sensing line 38 that delivers the pixel signal to the periphery of the array for further processing. Control signal RS is asserted to activate row select transistor 324 to transfer the pixel signal to column sensing lines 38. After charge sensing has been completed, floating diffusion node 314 is reset to supply voltage Vaa (e.g., a nominal positive power supply voltage provided on power supply line 322) by asserting control signal RST to turn on reset transistor 312. If desired, the charge storage region 302 can be reset at the same time as floating diffusion node 314 by simultaneously turning on both transistors 306 and 312.

The global shutter image sensor pixel 34 shown in FIG. 3 is merely illustrative and is not intended to limit the scope of the present embodiments. In general, global shutter image sensor pixel 34 may include any number of charge storage regions and any number of associated charge transfer, charge resetting, readout, and selection transistors for supporting a global shutter readout operation.

Figure 4:
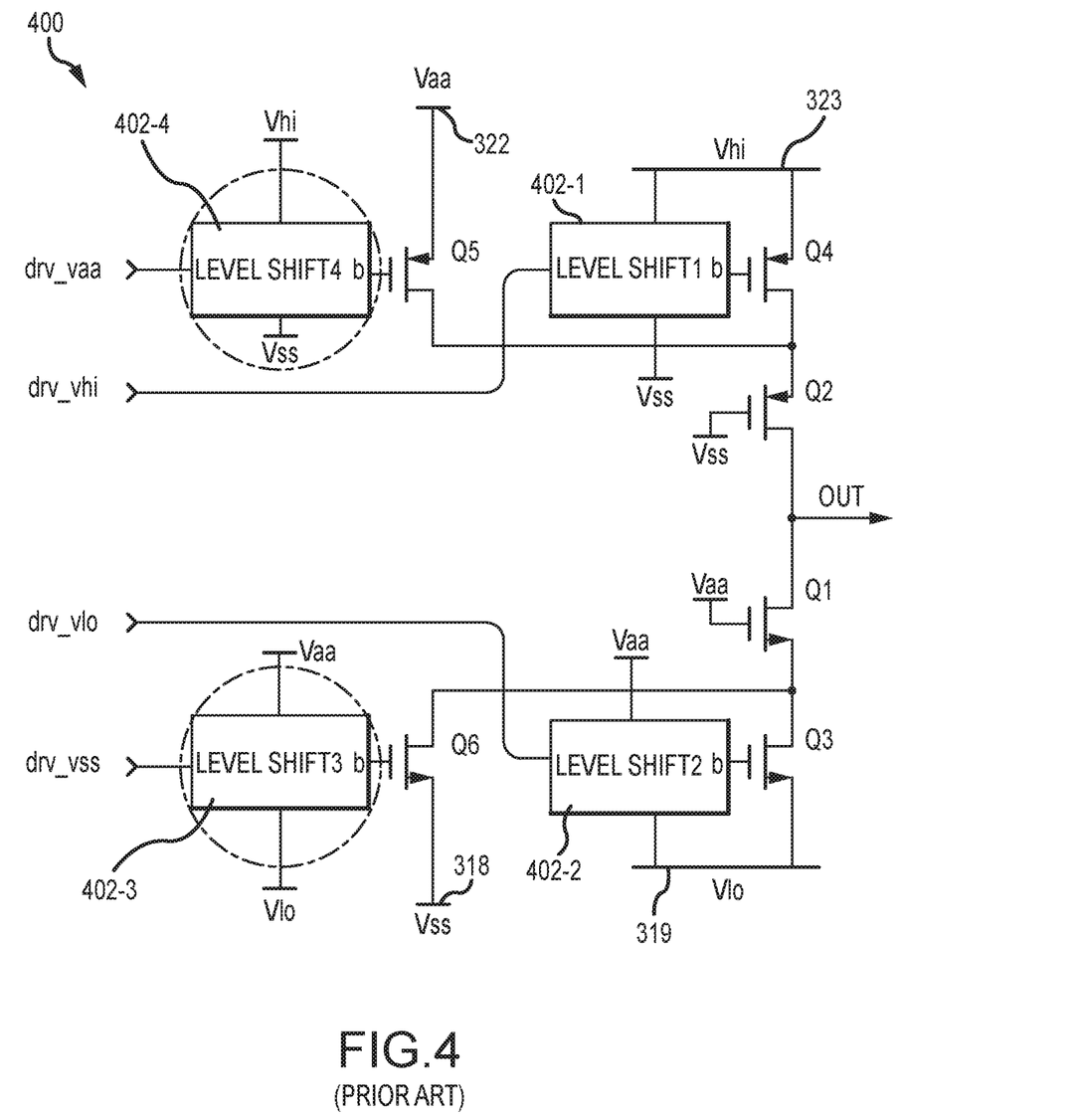
FIG. 4 is a circuit diagram of a conventional multi-voltage row driver.

Image sensor pixel 34 of FIG. 3 may receive row control signals from a multi-voltage row driver such as multi-voltage row driver 400 (see FIG. 4). Multi-voltage row driver 400 is capable of supplying bias voltages at Vaa, Vss, and two additional voltage levels Vhi and Vlo. Voltage Vhi is greater than voltage Vaa, whereas voltage Vlo is less than voltage Vss. For example, if Vaa and Vss are 3 V and 0 V, respectively, voltages Vhi and Vlo can be 4 V and −0.5 V, respectively. The ability of row driver 400 to supply Vhi to pixel transistors such as transistors 304, 306, 308, 312, and 324 can help improve the speed and efficiency of charge transfer, reset, and readout operations. The ability of row driver 400 to supply Vlo to pixel transistors such as transistors 304, 306, 308, 312, and 324 can help reduce dark current from being generated in pixel 34, which can suppress current leakage within pixel 34.

As shown in FIG. 4, row driver 400 includes a first level shifter 402-1, a second level shifter 402-2, a third level shifter 402-3, a fourth level shifter 402-4, and associated transistors Q1-Q6. Transistors Q1, Q3, and Q6 are n-type metal-oxide-semiconductor (NMOS) transistors, whereas transistors Q2, Q4, and Q5 are p-type metal-oxide-semiconductor (PMOS) transistors. N-type transistors Q1 and Q3 are connected in series between the output terminal of driver 400 (labeled "out" in FIG. 4) and power supply line 319 (i.e., a negative power supply line on which Vlo is provided). Transistor Q1 has a gate terminal that constantly receives Vaa, so transistor Q1 is always turned on. N-type transistor Q6 has a source terminal connected to power supply line 318 (i.e., a ground power supply line on which Vss is provided) and a drain terminal that is connected to the node interposed between transistors Q1 and Q3. Configured in this way, transistors Q3 and Q6 are selectively turned on to pull the row driver output low and are therefore sometimes referred to as "pull-down" transistors.

P-type transistors Q2 and Q4 are connected in series between the output terminal of driver 400 and power supply line 323 (i.e., a positive power supply line on which Vhi is provided). Transistor Q2 has a gate terminal that constantly receives Vss, so transistor Q2 is always turned on. P-type transistor Q5 has a source terminal connected to power supply line 322 (i.e., a positive power supply line on which Vaa is provided) and a drain terminal that is connected to the node interposed between transistors Q2 and Q4. Configured in this way, transistors Q4 and Q5 are selectively turned on to pull the row driver output high and are therefore sometimes referred to as "pull-up" transistors.

First level shifter 402-1 receives a first drive control input signal drv_vhi and outputs a corresponding signal to the gate terminal of transistor Q4 to selectively turn on transistor Q4. Since first level shifter 402-1 is powered by supply voltages Vhi and Vss, level shifter 402-1 will output Vss to turn on transistor Q4 and will output Vhi to turn off transistor Q4.

Similarly, fourth level shifter 402-4 receives a fourth drive control input signal drv_vaa and outputs a corresponding signal to the gate terminal of transistor Q5 to selectively turn on transistor Q4. Since fourth level shifter 402-4 is also powered by supply voltages Vhi and Vss, level shifter 402-4 will output Vss to turn on transistor Q5 and will output Vhi to turn off transistor Q5. Configured in this way, asserting control input signal drv_vaa will cause transistor Q5 to turn on and drive the row driver output to Vaa, whereas asserting control input signal drv_vhi will cause transistor Q4 to turn on and drive the row driver output to Vhi. At most one of signals drv_vaa and drv_vhi should be asserted at any point in time.

Second level shifter 402-2 receives a second drive control input signal drv_vlo and outputs a corresponding signal to the gate terminal of transistor Q3 to selectively turn on transistor Q3. Since second level shifter 402-2 is powered by supply voltages Vaa and Vlo, level shifter 402-2 will output Vaa to turn on transistor Q3 and will output Vlo to turn off transistor Q3. Similarly, third level shifter 402-3 receives a third drive control input signal drv_vss and outputs a corresponding signal to the gate terminal of transistor Q6 to selectively turn on transistor Q6. Since third level shifter 402-3 is also powered by supply voltages Vaa and Vlo, level shifter 402-3 will output Vaa to turn on transistor Q6 and will output Vlo to turn off transistor Q6. Configured in this way, asserting control input signal drv_vss will cause transistor Q6 to turn on and drive the row driver output to Vss, whereas asserting control input signal drv_vlo will cause transistor Q3 to turn on and drive the row driver output to Vlo. At most one of signals drv_vss and drv_vlo should be asserted at any point in time.

While the multi-voltage row driver 400 of FIG. 4 is able to drive the row driver output to voltage levels Vaa, Vhi, Vss, and Vlo, it requires at least four level shifters 402-1, 402-2, 402-3, and 402-4. Each level shifter 402 is fairly large, which can result in the entire row driver circuitry occupying a substantial amount of area at the periphery of the image sensor die. In certain imaging applications, it may be desirable to align the optical center of the die (i.e., the center of image pixel array 32 in FIG. 2) with the center of the image sensor die. Referring back to the example of FIG. 2, the column readout circuitry may be split into two halves into sub-circuits 42-1 and 42-2 to help achieve this alignment in the Y dimension. Row driver circuitry 40 that includes row drivers 400 of FIG. 4, however, can be relatively larger in size than control processing logic 44, which will cause misalignment in the X dimension (i.e., an overly large row driver circuitry will cause the pixel array optical center to me mismatched from the die center).

Moreover, each level shifter 402 draws a substantial amount of current. As an example, each level shifter 402 might draw up to 200 uA or more of dynamic current for each input voltage transition. This problem is especially exacerbated for pixels supporting global shutter operation (see pixel 34 of the type shown in FIG. 3), since a global transfer operation initiated by simultaneously asserting signal TX1 across the entire pixel array or a global draining operation initiated by simultaneously asserting anti-blooming signal AB across the entire pixel array will cause a level shifter in each row driver 400 to be turned on all at the same time, which would demand a huge transient current draw that could result in a temporarily voltage drop at the power supply and ground networks. Large current surges at the power supply network consumes a lot of dynamic power and is generally not desirable.

Figure 5:
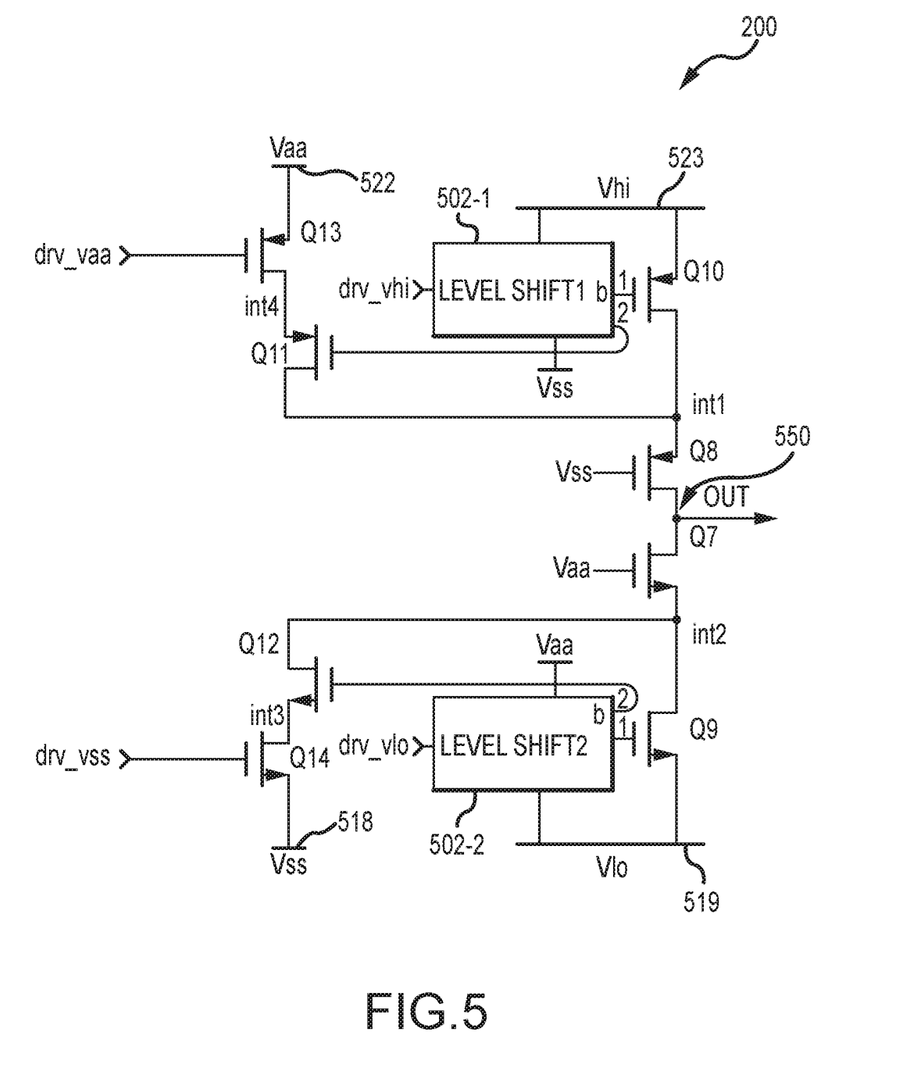
FIG. 5 is a circuit diagram of an illustrative multi-voltage row driver circuit that utilizes fewer level shifters than the conventional row driver shown in FIG. 4 in accordance with an embodiment.

In accordance with an embodiment, row driver circuitry 40 may be provided with row driver circuits 200 that are capable of supplying more than two power supply voltage levels without having to use four level shifters. FIG. 5 is a circuit diagram of an illustrative multi-voltage row driver circuit 200 that utilizes fewer level shifters than the conventional row driver 400 of FIG. 4. As shown in FIG. 5, row driver circuit 200 may include only two level shifting circuits 502-1 and 502-2 and associated transistors Q7-Q14. Transistors Q7, Q9, Q12, and Q14 may be NMOS transistors, n-type bipolar junction transistors (BJTs), n-channel transistors (e.g., transistors having channel regions that are n-doped), or other types of pull-down transistors, whereas transistors Q8, Q10, Q11, and Q13 may be PMOS transistors, p-type BJTs, p-channel transistors (e.g., transistors having channel regions that are p-doped), or other types of pull-up transistors. In general, transistors Q7-Q14 may be any suitable type of electrical/mechanical switch components.

P-type transistors Q8 and Q10 are coupled in series between the output terminal of row driver 200 (labeled as output node 550 in FIG. 5) and power supply line 523 (e.g., a positive power supply line on which Vhi is provided). Transistor Q8 has a gate terminal that constantly receives Vss, so transistor Q8 is always turned on. Transistor Q8 may serve to protect transistor Q10 from being overstressed. Since row driver output 550 is connected to Vlo most of the time when there is no pixel activity, the gate-to-drain voltage Vgd across transistor Q10 may be excessively high if transistor Q8 were not present, which can lead to reliability issues over time. By including transistor Q8, node int1 will be at least one threshold voltage above Vss, which helps reduce Vgd across transistor Q10. Transistor Q8 may be optional and can be omitted from row driver 200. First level shifter 502-1 has an input configured to receive drive control input signal drv_vhi, a first output on which an inverted version of signal drv_vhi is generated (as indicated by inversion "b"), and a second output on which a true non-inverted version of signal drv_vhi is generated. Level shifter 502-1 can only drive one of its two outputs low at any point in time. Since first level shifter 502-1 is powered by supply voltages Vhi and Vss, asserting signal drv_vhi will cause level shifter 502-1 to temporarily bias its first output to Vss to turn on transistor Q10 so that row driver output node 550 is driven up towards Vhi.

P-type transistors Q11 and Q13 are coupled in series between intermediate node int1 (i.e., the node connecting transistor Q8 to Q10) and power supply line 522 (e.g., a positive power supply line on which Vaa is provided). Transistor Q11 has a gate terminal that receives signals from the second output of level shifter 502-1. When transistor Q10 is turned on, transistor Q11 will be turned off since the second output of level shifter 502-1 is always inverted with respect to the first output. Otherwise when transistor Q10 is turned off, transistor Q11 will be turned on. Transistor Q13 has a gate terminal configured to receive drive control input signal drv_vaa. Asserting signal drv_vaa (e.g., by temporarily pulsing drv_vaa low since p-type transistors are "active-low" switches) turns on transistor Q13 so that row driver output node 550 is driven up towards Vaa.

N-type transistors Q7 and Q9 are coupled in series between row driver output 550 and power supply line 519 (e.g., a low or negative power supply line on which Vlo is provided). Transistor Q7 has a gate terminal that constantly receives Vaa, so transistor Q7 is always turned on. Transistor Q7 may serve to protect transistor Q9 from being overstressed. When driver output 550 is connected to Vhi when drv_vhi is asserted, the gate-to-drain voltage Vgd across transistor Q9 may be excessively high if transistor Q7 were not present, which can lead to reliability issues over time. By including transistor Q7, node int2 will be at least one threshold voltage below Vaa, which helps reduce Vgd across transistor Q9. Transistor Q7 may be optional and can be omitted from row driver 200. Second level shifter 502-2 has an input configured to receive drive control input signal drv_vlo, a first output on which a true non-inverted version of signal drv_vlo is generated, and a second output on which an inverted version of signal drv_vlo is generated (as indicated by inversion "b"). Level shifter 502-2 can only drive one of its two outputs low at any point in time. Since second level shifter 502-2 is powered by supply voltages Vaa and Vlo, asserting signal drv_vlo will cause level shifter 502-2 to temporarily bias its first output to Vaa to turn on transistor Q9 so that row driver output node 550 is driven down towards Vlo.

N-type transistors Q12 and Q14 are coupled in series between intermediate node int2 (i.e., the node connecting transistor Q7 to Q9) and power supply line 518 (e.g., a ground power supply line on which Vss is provided). Transistor Q12 has a gate terminal that receives signals from the second output of level shifter 502-2. When transistor Q9 is turned on, transistor Q12 will be turned off since the second output of level shifter 502-2 is always inverted with respect to its first output. Otherwise when transistor Q9 is turned off, transistor Q12 is activated. Transistor Q14 has a gate terminal configured to receive drive control input signal drv_vss. Asserting signal drv_vss (e.g., by temporarily pulsing drv_vss high since n-type transistors are "active-high" switches) turns on transistor Q14 so that row driver output terminal 550 is driven down towards Vss.

The example in which Vaa and Vhi are 3 V and 4 V, respectively, and where Vss and Vlo are 0 V and −0.5 V, respectively, is merely illustrative and is not intended to limit the scope of the present embodiments. In general, Vaa may be 1 V, 2 V, 3 V, 3-10 V, or other suitable positive power supply voltage level for powering the majority of circuit components in the core of the image sensor die; Vhi may be at least one transistor threshold voltage greater than Vaa or any suitable voltage level that is greater than Vaa; Vss may be 0 V, 0-2 V, −1 V, −2 V, or any suitable ground voltage level for powering the majority of circuit components in the core of the image sensor die; and Vlo may be at least one transistor threshold voltage less than Vss or any suitable voltage that is less than Vss.

Figure 6:
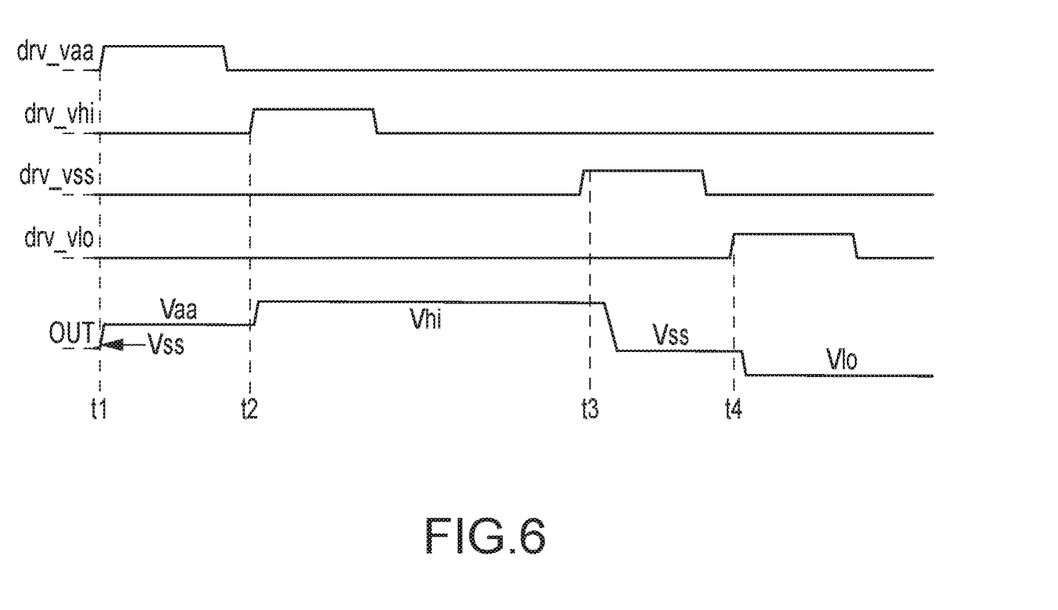
FIG. 6 is a timing diagram illustrating relevant signal waveforms for operating the multi-voltage row driver circuit of FIG. 5 in accordance with an embodiment.

FIG. 6 is a timing diagram illustrating relevant signal waveforms for operating multi-voltage row driver circuit 200 of the type described in connection with FIG. 5. Prior to time t1, all row driver input signals are deasserted. Note that the signal waveforms for the driver control signals drv_vaa, drv_vhi, drv_vss, and drv_vlo represent the logical assertion or deassertion of these signals, not the actual signal level. For instance, prior to time t1, signal drv_vaa is shown as deasserted, which means that signal drv_vaa will actually be high in order to turn off transistor Q13. As another example, prior to time t1, signal drv_vss is also deasserted, which means that signal drv_vss will actually be low in order to turn off transistor Q14. In general, prior to time t1, all transistors Q10, Q13, Q9, and Q14 should be turned off, and the row driver output node is biased at ground voltage level Vss.

At time t1, driver input signal drv_vaa is temporarily asserted (e.g., drv_vaa should be pulsed low) to turn on pull-up transistor Q13, which will cause row driver output node 550 to be driven up to Vaa. Input signal drv_vaa is then deasserted (e.g., drv_vaa is driven back up high) after some time to deactivate transistor Q13.

At time t2, driver input signal drv_vhi is temporarily asserted (e.g., drv_vhi is actually pulsed high, which will direct first level shifter 502-1 to temporarily drive its first output low) to turn on pull-up transistor Q10, which will cause row driver output node 550 to be further driven up to Vhi. Input signal drv_vhi is then deasserted (e.g., drv_vhi is driven back low) after some time to deactivate transistor Q10.

At time t3, driver input signal drv_vss is temporarily asserted (e.g., drv_vss should be pulsed high) to turn on pull-down transistor Q14, which will cause row driver output node 550 to be driven down to Vss. Input signal drv_vss is then deasserted (e.g., drv_vss is driven back down low) after some time to deactivate transistor Q14.

At time t4, driver input signal drv_vlo is temporarily asserted (e.g., drv_vlo is actually pulsed high, which will direct second level shifter 502-2 to temporarily drive its first output high) to turn on pull-down transistor Q9, which will cause row driver output node 550 to be further driven down to Vlo. Input signal drv_vlo is then deasserted (e.g., drv_vhi is driven back low) after some time to deactivate transistor Q9.

Configured and operated in this way, transistors Q11 and Q13 are used to drive the row driver output node to Vaa instead of requiring a level shifter (i.e., level shifter 402-4 in FIG. 4). Similarly, transistors Q12 and Q14 are used to drive the row driver output terminal to Vss instead of requiring a level shifter (i.e., level shifter 402-3 in FIG. 4). By lowering the required number of level shifters in multi-voltage row driver 200, the total area of row driver circuit 200 is substantially reduced, which can help match the pixel array optical center and the image sensor die sensor in the X dimension (see FIG. 2) and allow other auxiliary circuits to fit in periphery of the image sensor while dramatically reducing dynamic power consumption and preventing voltage drop at the power supply/ground networks.

Figure 7:
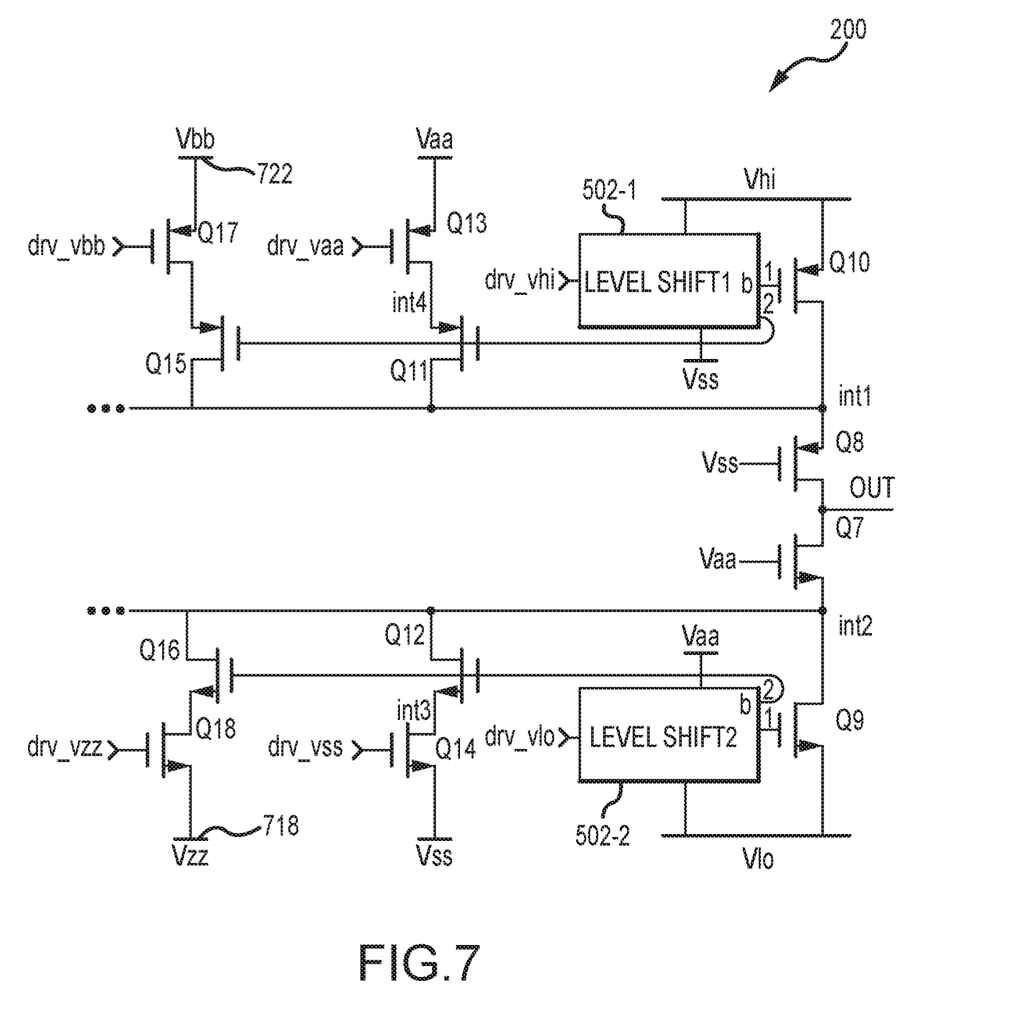
FIG. 7 is a circuit diagram of illustrating how the multi-voltage row driver circuit of FIG. 5 can be extended to support additional voltage levels in accordance with an embodiment.

The example of FIG. 5 in which multi-voltage row driver circuit 200 can generate a row control signal at four different voltage levels is merely illustrative and is not intended to limit the scope of the present embodiments. FIG. 7 illustrates another suitable embodiment where row driver 200 can be extended to support additional power supply voltage levels. As shown in FIG. 7, row driver circuit 200 may further include pull-up transistors Q15 and Q17 and pull-down transistors Q16 and Q18.

P-type transistors Q15 and Q17 are coupled in series between intermediate node int1 and power supply line 722 (e.g., a positive power supply line on which Vbb is provided). Power supply voltage Vbb may be a power supply voltage that is less than Vaa but greater than Vss, that is greater than Vaa, or that is even greater than Vhi. Transistor Q15 has a gate terminal that receives signals from the second output of level shifter 502-1. When transistor Q10 is turned on, transistor Q15 will be turned off since the second output of level shifter 502-1 is always inverted with respect to the first output. Otherwise when transistor Q10 is turned off, transistor Q15 will be turned on. Transistor Q17 has a gate terminal configured to receive drive control input signal drv_vbb. Asserting signal drv_vbb (e.g., by temporarily pulsing drv_vbb low since p-type transistor Q17 is an active-low switch) turns on transistor Q17 so that row driver output node 550 is driven up towards Vbb.

N-type transistors Q16 and Q18 are coupled in series between intermediate node int2 and power supply line 718 (e.g., a low power supply line on which Vzz is provided). Power supply voltage Vzz may be a power supply voltage that is greater than Vss but less than Vaa, that is less than Vss, or that is even less than Vlo. Transistor Q16 has a gate terminal that receives signals from the second output of level shifter 502-2. When transistor Q9 is turned on, transistor Q16 will be turned off since the second output of level shifter 502-2 is always inverted with respect to its first output. Otherwise when transistor Q9 is turned off, transistor Q16 will be turned on. Transistor Q18 has a gate terminal configured to receive drive control input signal drv_vzz. Asserting signal drv_vzz (e.g., by temporarily pulsing drv_vzz high since n-type transistor Q18 is an active-high switch) turns on transistor Q18 so that row driver output node 550 is driven down towards Vzz.

Figure 8:
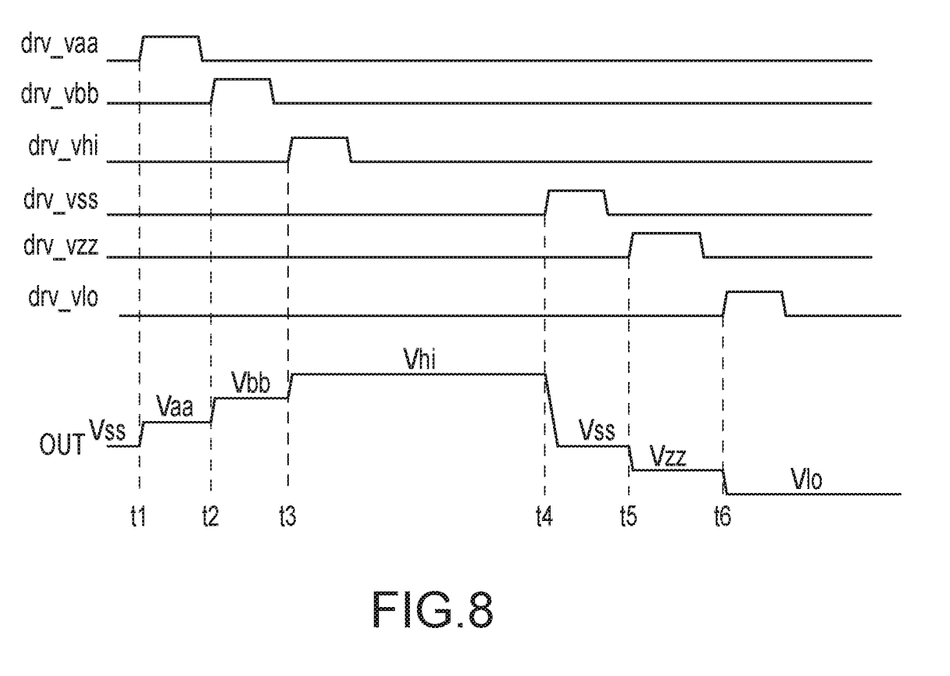
FIG. 8 is a timing diagram illustrating relevant signal waveforms for operating the multi-voltage row driver circuit of FIG. 7 in accordance with an embodiment.

FIG. 8 is a timing diagram illustrating relevant signal waveforms for operating multi-voltage row driver circuit 200 of the type described in connection with FIG. 7. Prior to time t1, all row driver input signals are deasserted. Note that the signal waveforms for the driver control signals drv_vaa, drv_vhi, drv_vss, drv_vlo, drv_vbb, and drv_vzz represent the logical assertion or deassertion of these signals, not the actual signal level.

At time t1, driver input signal drv_vaa is temporarily asserted (e.g., drv_vaa should be pulsed low) to turn on pull-up transistor Q13, which will cause row driver output node 550 to be driven up to Vaa. Input signal drv_vaa is then deasserted (e.g., drv_vaa is driven back up high) after some time to deactivate transistor Q13.

At time t2, driver input signal drv_vbb is temporarily asserted (e.g., drv_vbb should be pulsed low) to turn on pull-up transistor Q17, which will cause row driver output node 550 to be driven up to Vbb. In this example, note that Vbb is greater than Vaa but less than Vhi. This need not always be the case. Vbb could be less than Vaa or greater than Vhi, which might change the order of when drv_vbb is asserted. Input signal drv_vbb is then deasserted (e.g., drv_vbb is driven back up high) after some time to deactivate transistor Q17.

At time t3, driver input signal drv_vhi is temporarily asserted (e.g., drv_vhi is actually pulsed high, which will direct first level shifter 502-1 to temporarily drive its first output low) to turn on pull-up transistor Q10, which will cause row driver output node 550 to be further driven up to Vhi. Input signal drv_vhi is then deasserted (e.g., drv_vhi is driven back low) after some time to deactivate transistor Q10.

At time t4, driver input signal drv_vss is temporarily asserted (e.g., drv_vss should be pulsed high) to turn on pull-down transistor Q14, which will cause row driver output node 550 to be driven down to Vss. Input signal drv_vss is then deasserted (e.g., drv_vss is driven back down low) after some time to deactivate transistor Q14.

At time t5, driver input signal drv_vzz is temporarily asserted (e.g., drv_vzz should be pulsed high) to turn on pull-down transistor Q18, which will cause row driver output node 550 to be driven down to Vzz. In this example, note that Vzz is less than Vss but greater than Vlo. This need not always be the case. Vzz could be greater than Vss or less than Vlo, which might change the order of when drv_vzz is asserted. Input signal drv_vzz is then deasserted (e.g., drv_vss is driven back down low) after some time to deactivate transistor Q18.

At time t6, driver input signal drv_vlo is temporarily asserted (e.g., drv_vlo is actually pulsed high, which will direct second level shifter 502-2 to temporarily drive its first output high) to turn on pull-down transistor Q9, which will cause row driver output node 550 to be further driven down to Vlo. Input signal drv_vlo is then deasserted (e.g., drv_vhi is driven back low) after some time to deactivate transistor Q9.

Configured and operated in this way, transistors Q15 and Q17 are used to drive the row driver output node to an additional voltage level Vbb without requiring an additional level shifter. Similarly, transistors Q16 and Q18 are used to drive the row driver output terminal to Vzz instead of requiring an additional level shifter. By keeping the total number of level shifters in multi-voltage row driver 200 low, the total area of row driver circuit 200 is kept low, which can help match the pixel array optical center and the image sensor die sensor in the X dimension (see FIG. 2) and allow other auxiliary circuits to fit in periphery of the image sensor while dramatically reducing dynamic power consumption and preventing voltage drop at the power supply/ground networks. This technique can be extended to support six or more different power supply voltage levels.

The embodiments described herein can help reduce power consumption, especially for image pixels support global shutter operation. If desired, however, the techniques described in connection with FIGS. 5-8 can also be extended to rolling shutter image sensor pixels to ensure alignment of the pixel array optical center with the image sensor die sensor in the X dimension (see FIG. 2) and to allow other auxiliary circuits to fit in periphery of the image sensor while dramatically reducing dynamic power consumption and preventing voltage drop at the power supply/ground networks.

In various embodiments, an image sensor may include an array of image pixels and a row driver circuit configured to provide a control signal to a row of image pixels in the array. The row driver circuit may include an output terminal on which the control signal is generated, a first pull-up transistor operable to drive the output terminal to a first power supply voltage, a second pull-up transistor operable to drive the output terminal to a second power supply voltage that is different than the first power supply voltage, a first level shifting circuit configured to control the first and second pull-up transistors in parallel, a first pull-down transistor operable to drive the output terminal to a third power supply voltage that is less than the first and second power supply voltages, a second pull-down transistor operable to drive the output terminal to a fourth power supply voltage that is different than the third power supply voltage, and a second level shifting circuit configured to control the first and second pull-down transistors in parallel. The first and second level shifting circuits are the only level shifters in the row driver circuit.

In various embodiments, a method of operating an image sensor having an array of image pixels may involve using a row driver circuit to generate a control signal to a row of image pixels in the row, where generating the control signal includes using a first pull-up path in the row driver circuit to drive the control signal to a first power supply voltage, using a second pull-up path in the row driver circuit to drive the control signal to a second power supply voltage that is different than the first power supply voltage, using a first level shifting circuit in the row driver to simultaneously control both the first and second pull-up paths, using a first pull-down path in the row driver circuit to drive the control signal to a third power supply voltage that is less than the first and second power supply voltages, using a second pull-down path in the row driver circuit to drive the control signal to a fourth power supply voltage that is different than the third power supply voltage, and using a second level shifting circuit in the row driver to simultaneously control both the first and second pull-down paths.

In various embodiments, a row driver circuitry is provided that includes an output, a first pull-up path operable to drive the output to a first power supply voltage level, a second pull-up path operable to drive the output to a second power supply voltage level that is different than the first power supply voltage level, a first level shifter configured to selectively activate the first and second pull-up paths, a first pull-down path operable to drive the output to a third power supply voltage level that is less than the first and second power supply voltage levels, a second pull-down path operable to drive the output to a fourth power supply voltage level that is different than the third power supply voltage level, and a second level shifter configured to selectively activate the first and second pull-down paths. The second level shifter may have only one input, a first output connected to a first transistor in the first pull-down path, and a second output connected to a second transistor in the second pull-down path. The second level shifter may receive a driver control signal at its input, generate a corresponding pulse at its first output, and generate an inverted version of the pulse at its second output.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
    an array of image pixels; and
    a row driver circuit configured to provide a control signal to a row of image pixels in the array, wherein the row driver circuit comprises:
        an output terminal on which the control signal is generated;
        a first pull-up transistor operable to drive the output terminal to a first power supply voltage;
        a second pull-up transistor operable to drive the output terminal to a second power supply voltage that is different than the first power supply voltage;
        a first level shifting circuit configured to generate a first output signal to a gate terminal of the first pull-up transistor and to generate a second output signal to a gate terminal of the second pull-up transistor;
        a first pull-down transistor operable to drive the output terminal to a third power supply voltage that is less than the first and second power supply voltages;
        a second pull-down transistor operable to drive the output terminal to a fourth power supply voltage that is different than the third power supply voltage; and
        a second level shifting circuit configured to control the first and second pull-down transistors.

2. The image sensor of claim 1, wherein the first and second level shifting circuits are the only level shifters in the row driver circuit.

3. The image sensor of claim 1, wherein the row driver circuit further comprises:
    a third pull-up transistor that is interposed between the first pull-up transistor and the output terminal and that is also interposed between the second pull-up transistor and the output terminal; and
    a third pull-down transistor that is interposed between the first pull-down transistor and the output terminal and that is also interposed between the second pull-down transistor and the output terminal.

4. The image sensor of claim 3, wherein the third pull-up transistor has a gate terminal that constantly receives the fourth power supply voltage during normal operation of the image sensor, wherein the third pull-up transistor is configured to protect the first pull-up transistor from being overstressed, wherein the third pull-down transistor has a gate terminal that constantly receives the second power supply voltage during normal operation of the image sensor, and wherein the third pull-down transistor is configured to protect the first pull-down transistor from being overstressed.

5. The image sensor of claim 1, wherein the row driver circuit further comprises:
a third pull-up transistor connected in series with the second pull-up transistor; and
a third pull-down transistor connected in series with the second pull-down transistor.

6. The image sensor of claim 5, wherein:
the first level shifting circuit is configured to receive a first drive control input signal that is used to turn on the first pull-up transistor;
the third pull-up transistor is configured to receive a second drive control input signal;
the second level shifting circuit is configured to receive a third drive control input signal that is used to turn on the first pull-down transistor; and
the third pull-down transistor is configured to receive a fourth drive control input signal.

7. The image sensor of claim 1, wherein the row driver circuit further comprises:
a third pull-up transistor operable to drive the output terminal to a fifth power supply voltage that is different than the first and second power supply voltages, wherein the first level shifting circuit is further configured to control the third pull-up transistor; and
a third pull-down transistor operable to drive the output terminal to a sixth power supply voltage that is different than the third and fourth power supply voltages, wherein the second level shifting circuit is further configured to control the third pull-down transistor.

8. A method of operating an image sensor having an array of image pixels, the method comprising:
using a row driver circuit to generate a control signal to a row of image pixels in the row, wherein generating the control signal comprises:
using a first pull-down path in the row driver circuit to drive the control signal to a first power supply voltage;
using a second pull-down path in the row driver circuit to drive the control signal to a second power supply voltage that is different than the first power supply voltage; and
using a first level shifting circuit in the row driver to generate a first output signal to a gate in the first pull-down path and to generate a second output signal to a gate in the second pull-down path.

9. The method of claim 8, wherein generating the control signal further comprises:
using a first pull-up path in the row driver circuit to drive the control signal to a third power supply voltage that is greater than the first and second power supply voltages;
using a second pull-up path in the row driver circuit to drive the control signal to a fourth power supply voltage that is different than the third power supply voltage; and
using a second level shifting circuit in the row driver to control both the first and second pull-up paths.

10. The method of claim 9, wherein using the second level shifting circuit to control both the first and second pull-up paths comprises:
using the second level shifting circuit to provide a first output signal to a first pull-up transistor in the first pull-up path; and
using the second level shifting circuit to provide a second output signal to a second pull-up transistor in the second pull-up path.

11. The method of claim 10, wherein using the first level shifting circuit to control both the first and second pull-down paths comprises:
using the first level shifting circuit to provide a first output signal to a first pull-down transistor in the first pull-down path; and
using the first level shifting circuit to provide a second output signal to a second pull-down transistor in the second pull-down path.

12. The method of claim 11, wherein generating the control signal further comprises:
asserting a first input signal at an input of the second level shifting circuit to activate the first pull-up path; and
asserting a second input signal to activate the second pull-up path, wherein at most one of the first and second pull-up paths is activated at any given point in time during normal operation of the image sensor.

13. The method of claim 12, wherein generating the control signal further comprises:
asserting a third input signal at an input of the first level shifting circuit to activate the first pull-down path; and
asserting a fourth input signal to activate the second pull-down path, wherein at most one of the first and second pull-down paths is activated at any given point in time during normal operation of the image sensor.

14. The method of claim 13, wherein generating the control signal further comprises:
temporarily asserting the second input signal to activate the second pull-up path;
deasserting the second input signal;
after deasserting the second input signal, temporarily asserting the first input signal to activate the first pull-up path;
deasserting the second input signal;
after deasserting the second input signal, temporarily asserting the fourth input signal to activate the second pull-down path;
deasserting the fourth input signal; and
after deasserting the fourth input signal, temporarily asserting the third input signal to activate the first pull-down path.

15. A driver circuit, comprising:
an output;
a first pull-up path operable to drive the output to a first power supply voltage level;
a second pull-up path operable to drive the output to a second power supply voltage level that is different than the first power supply voltage level;
an additional pull-up transistor that is always turned on during normal operation to prevent at least one transistor in the first and second pull-up paths from being overstressed; and
a first level shifter configured to selectively activate the first and second pull-up paths.

16. The driver circuit of claim 15, further comprising:
a first pull-down path operable to drive the output to a third power supply voltage level that is less than the first and second power supply voltage levels;
a second pull-down path operable to drive the output to a fourth power supply voltage level that is different than the third power supply voltage level; and
a second level shifter configured to selectively activate the first and second pull-down paths.

17. The driver circuit of claim 16, wherein the first and second level shifters are the only level shifters in the driver circuit.

18. The driver circuit of claim 16, wherein the second level shifter has only one input, a first output connected to a first transistor in the first pull-down path, and a second output connected to a second transistor in the second pull-down path.

19. The driver circuit of claim 18, wherein the second level shifter is configured to receive a driver control signal at its input, to generate a corresponding pulse at its first output, and to generate an inverted version of the pulse at its second output.

\* \* \* \* \*